Feb. 8, 1949.  S. M. CARPER  2,461,370
SHEARS
Filed April 16, 1946  2 Sheets-Sheet 1
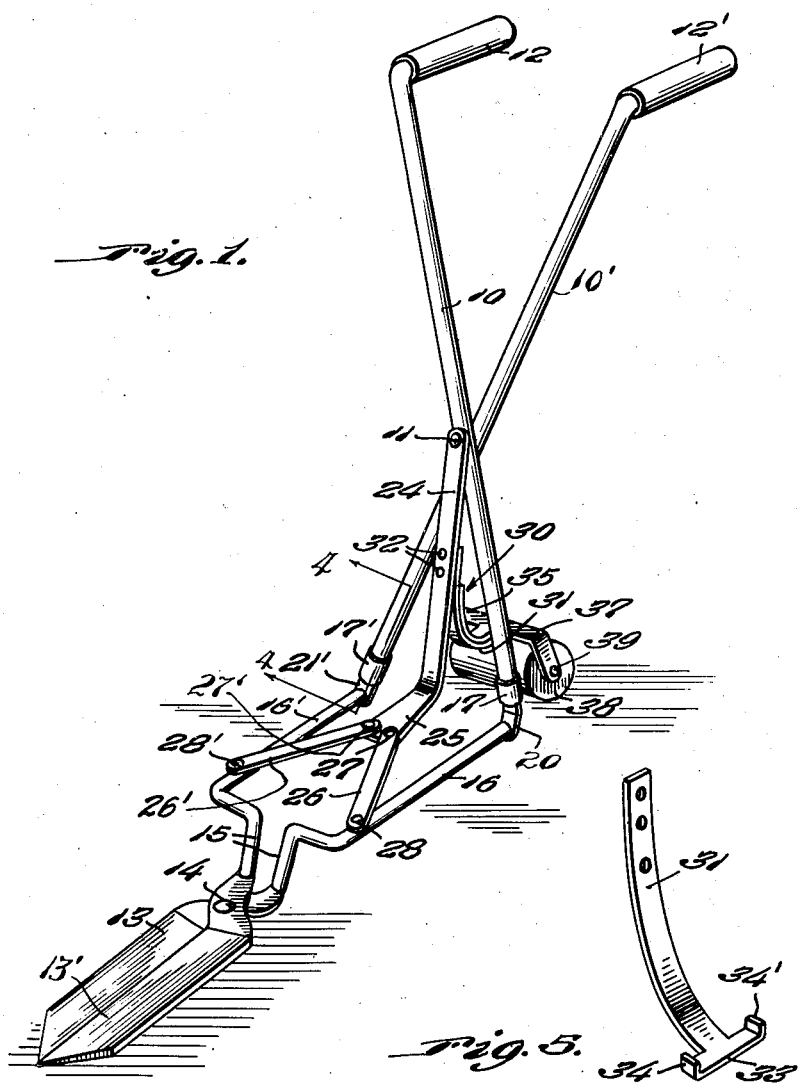
Inventor
Stanley M. Carper
By Clarence A. O'Brien
and Harvey B. Jacobson
Attorneys Feb. 8, 1949.  S. M. CARPER  2,461,370
SHEARS
Filed April 16, 1946  2 Sheets-Sheet 2
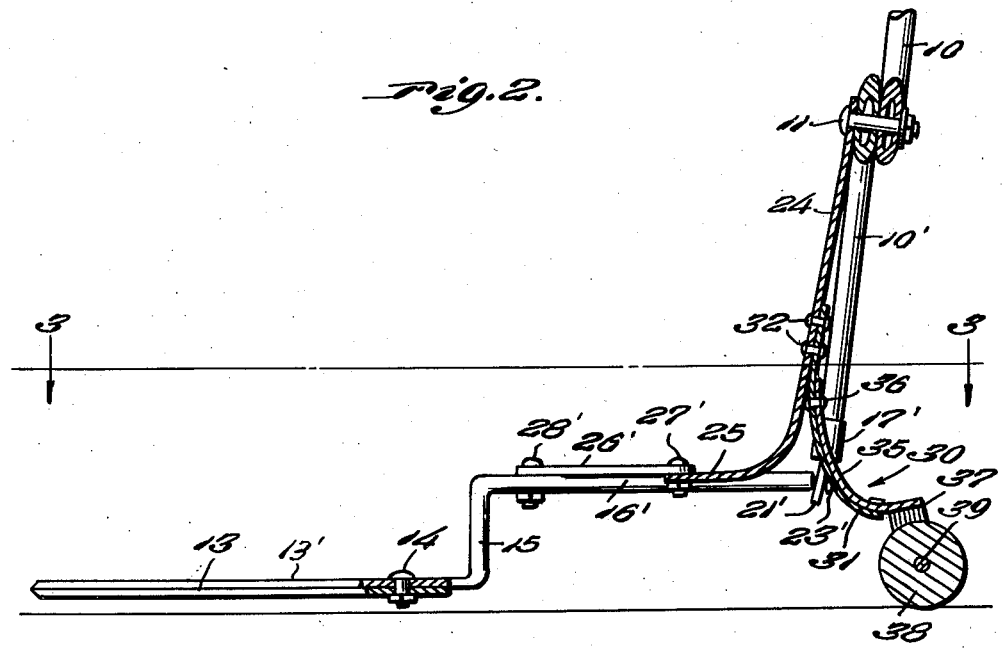
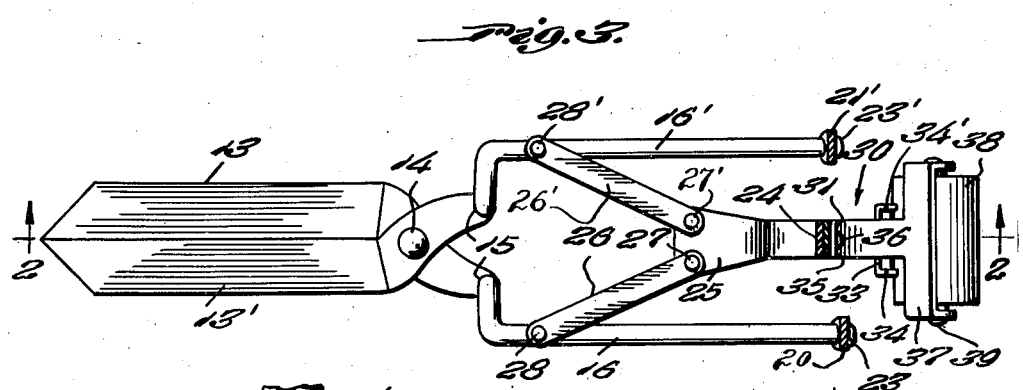
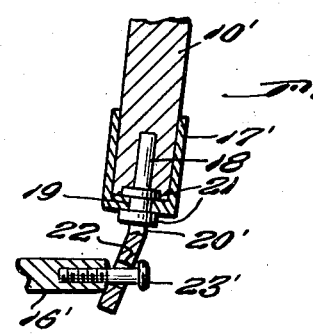
Inventor
Stanley M. Carper
By Clarence A. O'Brien
and Harvey B. Jacobson
Attorneys Patented Feb. 8, 1949

2,461,370

UNITED STATES PATENT OFFICE 2,461,370

SHEARS

Stanley M. Carper, Sheffield County, Conn.

Application April 16, 1946, Serial No. 662,492

6 Claims. (Cl. 56—241)

This invention relates to new and useful improvements and structural refinements in shears, more specifically, to shears of the character herein described, such as are commonly employed for the cutting of weeds, the trimming of edges of lawns, and for similar other operations which cannot be satisfactorily performed by means of a lawn mower.

The principal object of the invention is to provide shears in which the cutting blades are positioned at the lower ends of upwardly extending operating levers, thus making it unnecessary for the operator to bend down or kneel on the ground, in order to perform the cutting operations.

A further object of the invention is to provide shears which are readily adjustable to various inclinations of the ground surface.

An additional object of the invention is to provide shears which are simple in construction, smooth in operation, and in which the minimum effort is required to manipulate the same.

With the above more important objects in view, and such other objects as may become apparent as this specification proceeds, the invention consists essentially of the arrangement and construction of parts as illustrated in the accompanying drawings, in which:

Figure 1 is a perspective view of the invention.

Figure 2 is a central, cross sectional view thereof, the same being taken approximately in the plane of the line 2—2 in Figure 3.

Figure 3 is a cross sectional view, taken in the plane of the line 3—3 in Figure 2, with the exception that the levers 10, 10' have been omitted, only the portions 20, 21' of the pins 20' being shown in cross section.

Figure 4 is a fragmentary, cross sectional detail, taken substantially in the plane of the line 4—4 in Figure 1, and Figure 5 is a perspective view of a strap extension used in the invention.

Like characters of reference are used to designate like parts in the specification and throughout the several views.

Referring now to the accompanying drawings in detail, the invention embodies in its construction a pair of crossed, upwardly extending levers 10, 10' pivotally connected at the intersection thereof as at 11, and forming a pair of suitable operating handles 12, 12' at their upper extremities.

A pair of crossed, substantially horizontal shear blades 13, 13' are pivotally connected as at 14, said blades extending past the pivoted intersection thereof and being upwardly offset as at 15, to constitute a pair of operating arms 16, 16'.

If desired, the arms 16, 16' may be formed integrally with the respective blades 13, 13' as will be clearly apparent from the accompanying drawings.

Caps 17, 17' are secured at the lower ends of the levers 10, 10', the latter being formed with central, blind bores 18, while the caps 17, 17' themselves, are provided with central bores 19. Pins 20' pass freely through the respective bores 19 and are rotatably receivable in the bores 18, each of said pins being provided with a pair of spaced shoulders 21, whereby the pins are retained in position.

The outer extremities of the pins 20' are flattened as at 20, 21', these flattened portions, in turn, being formed with the apertures or eyes 22. Suitable bolts 23, 23' project from the free ends of the arms 16, 16', said bolts freely engaging the eyes 22 of the aforementioned pins. It will be noted that in this manner, a flexible connection is provided between the arms 16, 16' of the blades 13, 13' and the lower ends of the levers 10, 10'.

A strap 24 is secured at one end thereof to the pivot bolt 11 at the intersection of the levers 10, 10', said strap extending downwardly and forming a relatively wide, forwardly angulated portion 25 at its lower end. A pair of equalizing bars 26, 26' are pivoted at one end as at 27, 27' to the portion 25. The remaining ends of the bars 26, 26' are pivotally connected as at 28, 28' to intermediate portions of the respective arms 16, 16'. The arrangement of the strap 24, 25 and the bars 26, 26' is best illustrated in the accompanying Figures 1 and 3.

A bracket designated generally by the reference character 30 is associated with the strap 24, said bracket consisting of an arcuate extension 31, riveted or otherwise similarly secured as at 32, to the strap 24 intermediately the length of the latter. The extension 31 projects downwardly and rearwardly and terminates in transversely extending portion 33, this, in turn, being provided at each end thereof with upturned lugs 34, 34'.

An arcuate strip 35 is pivotally connected at one end thereof as at 36 to the extension 31, the strip 35 being complementary to and positioned adjacent to said extension. The lower end portion of the strip 35 passes between the lugs 34 and terminates in a yoke 37, configurated substantially as shown. A supporting roller 38 is rotatably positioned upon a shaft 39 journalled in the sides of the yoke 37, as will be clearly apparent from the accompanying drawings.

When the invention is placed in use, the blades 13, 13' are, of course, operated by manipulating the handles 12, 12' and it will be noted that in this manner, the operator may remain in an erect position while the cutting operation is being preformed close to the ground. Furthermore, by virtue of the forwardly disposed relationship of the blades 13, 13' with respect to the levers 10, 10' the shears may be manipulated with high degree of dexterity and efficiency in otherwise poorly accessible locations.

When it is desired to operate the shear blades at an angle, so to speak, such as on inclined surfaces of ground, the levers 10, 10' and the associated blades 13, 13' may be swung transversely with respect to the roller 38, about the pivoted connection 36. During this action, the strip 35 will move freely between the lugs 34, and the extent of the swinging movement of said levers and blades will be limited by the extent of movement of the strip 35 between the lugs.

Inasmuch as the blades 13, 13' are pivoted together at 14 while the levers 10, 10' are pivoted together at 11, and inasmuch as the bars 26, 26' are pivoted to the arms 16, 16' and to the strap 24 which, in turn, is connected to the pivot 11 of the levers, movement of the levers 10, 10' will be transmitted "symmetrically" through the arms 16, 16' and bars 26, 26' to the blades 13, 13', so that if one of the handles 12, 12' is moved through a greater or lesser distance than the second handle, the combined movement of the two handles will be equally distributed to produce an equal movement of the two blades 13, 13'.

It is believed that the advantages and use of the invention will be clearly apparent from the foregoing disclosure, and accordingly, further description thereof at this point is considered unnecessary.

While in the foregoing there has been shown and described the preferred embodiment of this invention it is to be understood that minor changes in the details of construction, combination, and arrangement of parts may be resorted to without departing from the spirit and scope of the invention as claimed.

What I claim as my invention is:

1. Shears comprising in combination, a pair of crossed, upwardly extending levers pivotally connected at the intersection thereof and forming handles at their upper ends, a pair of crossed, substantially horizontal shear blades pivotally connected together and extending past the intersection thereof to constitute a pair of operating arms, a flexible connection between the free end of each of said arms and the lower end of one of said levers, a strap secured at one end thereof at the intersection of said levers and extending downwardly therefrom, a forwardly angulated portion at the lower end of said strap, a pair of equalizing bars, each connected at one end thereof to said angulated portion and at its remaining end to one of said arms, a downwardly and rearwardly extending bracket connected to said strap, and a supporting roller rotatably mounted in said bracket.

2. The device as defined in claim 1, in which said bracket is povotally connected to said strap.

3. Shears comprising in combination, a pair of crossed, upwardly extending levers pivotally connected at the intersection thereof, a pair of operating handles at the upper ends of said levers, a pair of crossed, substantially horizontal shear blades pivotally connected together and extending past the intersection thereof to constitute a pair of upwardly offset operating arms, a flexible connection between the free end of each of said arms and the lower end of one of said levers, a strap secured at the intersection of said levers and extending downwardly therefrom, a relatively wide, forwardly angulated portion at the lower end of said strap, a pair of equalizer bars each pivotally connected at one end thereof to said angulated portion, the remaining end of each of said bars being pivotally connected to an intermediate portion of one of said arms, an arcuate strip pivotally connected at one end thereof to said strap, said strip extending downwardly and rearwardly and terminating in a transversely extending yoke, and a supporting roller rotatably mounted in said yoke, said levers and said associated blades being transversely swingable with respect to said roller.

4. The device as defined in claim 3 together with means for limiting the swinging movement of said levers and said blades.

5. The device as defined in claim 3 together with means for limiting the swinging movement of said levers and said blades, said means comprising an arcuate extension on said strap, said extension being complementary to and positioned adjacent said strip, a transversely disposed portion at the lower end of said extension, and an angulated lug at each end of said transversely disposed portion, said strip extending between said lugs and being pivotally connected at the upper end thereof to said extension, the transverse movement of said strip between said lugs limiting the swinging movement of said levers and said blades.

6. The device as defined in claim 3, in which said flexible connection of each of said arms to one of said levers comprises in combination, a cap secured to the lower end of said lever, a pin rotatably mounted in said cap and protruding from the end thereof, said pin being formed with an eye in its protruding end, and a bolt projecting from the free end of said arm, said bolt freely engaging said eye.

STANLEY M. CARPER.

REFERENCES CITED

The following references are of record in the file of this patent:

UNITED STATES PATENTS

| Number | Name | Date |
|---|---|---|
| 1,432,241 | Goodwin | Oct. 17, 1922 |
| 1,647,085 | Dearborn | Oct. 25, 1927 |